US012248468B2

(12) United States Patent
Clark et al.

(10) Patent No.: US 12,248,468 B2
(45) Date of Patent: *Mar. 11, 2025

(54) MACHINE LEARNED SCHEDULING OF DATA RETRIEVAL TO AVOID SECURITY RESTRICTION FLAGGING

(71) Applicant: Tangoe US, Inc., Stamford, CT (US)

(72) Inventors: Dale L. Clark, Mukilteo, WA (US); Silviu Lupsa, Orange, CT (US); Zachary Goldberg, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,695

(22) Filed: Oct. 31, 2023

(65) Prior Publication Data

US 2024/0061836 A1    Feb. 22, 2024

Related U.S. Application Data

(63) Continuation of application No. 17/863,301, filed on Jul. 12, 2022, now Pat. No. 11,847,114, which is a continuation of application No. 17/065,307, filed on Oct. 7, 2020, now Pat. No. 11,416,483.

(51) Int. Cl.
*G06F 17/30* (2006.01)
*G06F 16/2453* (2019.01)
*G06F 16/2455* (2019.01)
*G06F 21/44* (2013.01)
*G06F 21/62* (2013.01)

(52) U.S. Cl.
CPC .... *G06F 16/2453* (2019.01); *G06F 16/24564* (2019.01); *G06F 21/44* (2013.01); *G06F 21/6227* (2013.01); *G06F 21/629* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 7,370,014 B1* | 5/2008 | Vasavada | G06Q 20/04 705/40 |
| 7,711,738 B1* | 5/2010 | Kraft | G06F 16/958 707/769 |
| 7,958,049 B2* | 6/2011 | Jamison | G06Q 20/14 705/40 |
| 8,612,598 B1 | 12/2013 | Chaudhry et al. | |
| 2005/0032573 A1* | 2/2005 | Acres | G07F 17/3234 463/25 |
| 2008/0015982 A1 | 1/2008 | Sokolic et al. | |
| 2011/0060443 A1 | 3/2011 | Schwarm | |
| 2011/0270724 A1 | 11/2011 | O'Neil et al. | |
| 2013/0246280 A1 | 9/2013 | Kirsch | |

(Continued)

*Primary Examiner* — Hung D Le
(74) *Attorney, Agent, or Firm* — Farber LLC; Jonathan Winter

(57) ABSTRACT

A system and method of automated data collection which adjusts and reacts to expected availability of update data as well as adjusts and reacts to security restrictions in order to obtain update data as soon as reasonably possible without triggering security lockouts or other restrictions which require excessive amounts of manual intervention. The system and methods provide for efficient and timely collection of invoice data for timely processing, auditing and action.

20 Claims, 6 Drawing Sheets

(56) References Cited

U.S. PATENT DOCUMENTS

| | | | |
|---|---|---|---|
| 2013/0318536 A1* | 11/2013 | Fletcher | G06F 9/54 718/104 |
| 2014/0337188 A1* | 11/2014 | Bennett | G06Q 20/102 705/40 |
| 2015/0310406 A1* | 10/2015 | Anderson | G06Q 30/04 705/40 |
| 2016/0255016 A1 | 9/2016 | Miller | |
| 2016/0321403 A1* | 11/2016 | Wang | G16H 50/20 |
| 2017/0161730 A1* | 6/2017 | Hattar | G06Q 20/1085 |
| 2017/0222866 A1* | 8/2017 | Wang | H04L 67/12 |
| 2018/0246942 A1* | 8/2018 | Chen | G06F 16/248 |
| 2019/0114683 A1* | 4/2019 | Mundhra | G06Q 30/08 |
| 2019/0123986 A1* | 4/2019 | Igarashi | G05B 19/4185 |
| 2019/0124384 A1* | 4/2019 | Skowronski | H04N 21/26233 |
| 2020/0074099 A1* | 3/2020 | Felice-Steele | H04L 63/0884 |
| 2021/0064523 A1* | 3/2021 | Kale | G06F 12/0246 |
| 2022/0050761 A1* | 2/2022 | Alt | G06F 11/3082 |

\* cited by examiner

MACHINE LEARNED SCHEDULING OF DATA RETRIEVAL TO AVOID SECURITY RESTRICTION FLAGGING

FIELD OF THE INVENTION

The present invention relates to systems and methods for obtaining update data from remote data stores including data such as invoices, or the necessary data available on invoices, and in particular the methods required for access to on-line sites and information sources that supply invoices, in such a way that does not create or flag security concerns. The system incorporates machine learning to optimize retry intervals and correlates results across accounts residing on systems to minimize access and optimize gathering the desired information at the earliest opportunity.

BACKGROUND OF THE INVENTION

The typical corporation's IT spend has progressively grown year over year and an increasing number of departments and functions rely upon IT services for their day to day business activities. These include applications, cloud software, communication services, devices, data centers, hosting costs, and an increasing number and variety of IT expenses.

The charges for these services have also become increasingly complex over time. Service providers differentiate their services with pricing that may reflect their operating model. Competing vendors offering similar solutions may bill their services quite differently making it confusing for enterprise customers to compare pricing or to even fully understand the charges on the bill they receive. Due to the nature of the services and their importance to the business, the invoices are often not looked at in detail and rarely challenged.

As a result, many of these companies have hired service providers to review, audit and process invoices for these expenses. These service providers will typically monitor, audit and process numerous invoices for multiple different customers with many different vendors. Furthermore, timely payment of invoices or payment within a certain period of time often is encouraged through provision of discounts by the service provider. At the same time, invoices need to be audited to ensure the correct amounts have been billed. Therefore, the amount of time available to review invoices is critical for both timely processing.

With these service providers having multiple customers and multiple different vendors to obtain invoices from, the task of efficiently gathering invoice data is a momentous one. This task can be made more difficult when vendor systems and security protocols are revised and updated such that a set schedule could result in trying to obtain data too early and thus causing un-necessary strain on the vendor system (which could result in a security lockout or lesser restriction) or could result in trying to obtain data much later than that data was first available.

Jamison, in U.S. Pat. No. 7,958,049 describes a system for obtaining invoices from vendor systems and paying these on behalf of customers but Jamison does not make any provisions for handling of the retries other than retrying the next day or logging the error.

Vasavada, in U.S. Pat. No. 7,370,014 discloses a method by which a bot is initiated for invoice retrieval on behalf of a customer, but this bot simply attempts to access the system at scheduled times and notifies the user if the access to the invoicing system fails. There is no indication of how failures are re-scheduled or that the schedule can be dynamically changed based on interactions with the external systems where invoices are obtained from.

SUMMARY OF THE INVENTION

A typical large enterprise may have charges from a multitude of wireless providers, fixed wireline service providers, hosting and cloud service providers, and application providers. In organizations with a presence in multiple geographies, there are likely to be additional regional suppliers and region-specific offerings added to the mix.

Shadow IT has also become an increasingly prevalent contributor to expenses where IT services are invoiced directly to departments or individuals within a department. This is partly due to the ease with which many turnkey services can be deployed and purchased without the need for an internal IT departments oversight. In many cases, invoice review in these situations is even more lacking, not to mention increased concerns around security, vendor qualification and a lack of many of the typical procurement practices.

In addition to the invoices being complex to understand, the audit or dispute process can be equally complex, challenging, and time consuming. To a large degree these same corporations may spend much more time reviewing travel expense reports than telecom invoices despite the latter being a substantially larger line item on the balance sheet.

With the changing demands of users, the varying offerings from providers as well as the emergence of new providers, it is difficult to know if one is getting a good deal, never mind the best deal. Some companies have moved to hire dedicated expense management experts to stay on top of these invoices, but with the increasing complexity, a single person or even a small department may be insufficient to ensure that the company is doing the best it can.

More and more companies are outsourcing this oversight and management to third party companies that specialize in managing and optimizing IT spend. Companies that have become specialized in IT spend often have large departments knowledgeable in the latest offerings across regions. These specialty companies have often developed their own tools to evaluate and determine their customers' needs and estimate their spend. In many cases, machine intelligence and predictive algorithms are required to analyze and forecast complex cost models, needs, and trends.

Further, many have invested in systems to interface with common vendor billing systems to automate processes such as invoice collection. A task that may be overly costly or complex for a single customer to do with each vendor, but one that can be justified for specialty companies that provide services for many customers dealing with the same providers.

The outsourcing of expense management to these third-party companies is justifiable as the added tools and expertise will typically save more money for the customers than the added cost of the services. This third party collects and processes invoices on the behalf of a company, typically with a fee which may guarantee some overall reduction in cost of expenses obtained based on the company's expertise and efficiency. Some companies also provide services for a percentage of the spend, expecting to have some amount of savings which will cover the cost of their services.

Companies that specialize in these spend areas can also recommend and select the most appropriate suppliers and services, as well as efficiently oversee and audit the billing of these services for their customers. Not only do they companies help optimize spend within the parameters of existing contracts and commitments, but they are often intimately involved in negotiating future contracts on behalf of the company. By providing such services to multiple entities, these third parties can leverage economies of scale.

Enterprises receive invoices from their suppliers in a variety of different formats. These include both paper invoices and invoices in electronic form. Paper invoices may get lost in the mail, they may be delayed or misplaced. Even when they do arrive, the time to open and process the mail and scan the invoices adds delays to processing the invoice. Conversion to a machine readable and normalized format can also be challenging.

Electronic invoices can be presented in picture or PDF formats or in a machine-readable format. Some popular machine-readable formats include Electronic Data Exchange (EDI), Comma Separate Values (CSV), and extensible markup language (XML).

When using API interfaces to retrieve invoice data, it may be possible to query individual fields separately to obtain raw data pertaining to the charges rather than a fixed format invoice.

Most of the time, invoices are sent to customers by the supplier, but in many circumstances where billing systems can be queried, invoice data may also be retrieved with processes initiated by the customers accessing these systems.

This access to vendor billing systems will typically require the use of an authentication key which may be a set of supplied credentials, or in some cases it may be via application programming interfaces (APIs) with a form of authentication. Advantages to gathering the invoice data this way include having the data in electronic format.

For some suppliers, and in particular for telecommunications expenses, the early payment of an invoice comes with incentives and reductions in the amounts due. For a large company, with many devices these discounts may be substantial. A primary goal is to obtain the invoices rapidly to take advantage of early payment incentives and discounts.

It is also beneficial to have invoices early to review, escalate, and approve or audit any discrepancies in a timely manner.

Collecting the invoices electronically also poses some challenges. First off, the invoices are almost always behind a secure portal so the management of credentials on behalf of the company is necessary. These may be special rules to change these credentials periodically, and they may automatically force these changes, so systems must adapt to incorporate these methods.

The ability to capture the data from the system also varies. Some systems will not provide a simple downloadable format, so a technique such as screen scraping must be used to extract the data. This method requires knowledge of the layout of the screen so that the system knows where to obtain the fields it is looking for. Of course, changes to the layout, redesigns of the screens or the addition of new fields (or even changing the position of existing fields) can all break the retrieval system or corrupt the data obtained (causing further downstream complications) and a requirement to implement rigorous checks and balances to ensure no under or over payments are made is needed.

To obtain the data as soon as it is available it is also key so that the incentives for early payment can be obtained. This process can be hampered by the availability of the invoice which may follow a predictable but inexact cycle. For example, while invoices may be prepared at a fixed schedule, there are events that may occur which make the availability of the invoice an inexact science. Anomalies such as absence, illness, or tardiness of those processing or validating the data, holidays or weekends falling on the availability dates, or even equipment or systems issues or upgrades that delay the availability can occur.

To make matters worse, systems do not tolerate repeated retries from external systems or entities to get this data. These protections are in place primarily to thwart attacks such as DoS (Denial of Service), or other hacker attempts to get into the system to retrieve information. The variety of sophistication in countermeasures can vary in systems, but can include the introduction of pauses, additional security challenges, forced password change, or redirects to specific URLs. In dedicated invoicing systems these are often application specific. In the event that the requesting party is flagged as a potential security concern, the system may take more aggressive action such as blocking the user, the account, or the originating IP address. Undoing these blockages can take even more time and will likely involve manual efforts of calling support, providing important corporate and account information to confirm one's identity, and even then, it may take time to unblock access. This exasperates the problem where one is trying to obtain the invoices as quickly as possible to maximize downstream processing times.

Accordingly, a system which intelligently updates timing of querying and re-querying of data can both obtain invoices early but not request those invoices too early in situations where updates are not available. The re-querying to obtain updates can be done in a way that avoids security restrictions by the server from which the data is being obtained from and also avoids un-necessary strain on that server and associated computing resources which would be expected to provide better longevity of those computing resources and fewer failures. At the same time, the system balances the need to obtain updates to invoicing data in a timely manner and also reacts to updates to security protocols or login attempts based on detecting restrictions placed on logins, provision of challenge screens or other security measures.

It would thus be very beneficial to have a system that was capable of obtain the invoice data as soon as it is available to maximize the time available for downstream processing to ensure that any and all available incentives can be obtained.

It would be further beneficial to have a system that did not trigger security related lockouts or flagging when attempting to access the information from vendor systems.

It would be still further beneficial to have such a system capable of handling error conditions and escalating these to manual processes in the event of occurrence.

It would be still further beneficial to have a system capable of learning and improving performance over time based on results and successful or failed access attempts.

Therefore, a need exists for a system that can apply machine learning to optimize the access to vendor billing information and provide this information to an entity responsible for bill payment in a timely manner.

Therefore, it is an object of the present invention to provide improved methods and controls to access invoice data from vendor billing systems.

It is further and object to provide a system and method to for obtaining invoices or the necessary data to create invoices, and in particular the methods required for access to on-line sites in a way that does not create or flag security concerns.

It is a further object to provide a system and method that incorporates machine learning to optimize retry intervals and correlate accounts across similar systems to minimize access and optimize information retrieval with each access.

It is also an object to provide a system and method that can adjust to errors and edge cases triggering manual intervention in a timely manner.

It is also an object to have such a system run in an autonomous manner or to be triggered manually.

These and other objects are achieved by providing a system for automated data collection which adjusts and reacts to expected availability of update data as well as adjusts and reacts to security restrictions in order to obtain update data as soon as reasonably possible without triggering security lockouts or other restrictions which require excessive amounts of manual intervention. The system and methods provide for efficient and timely collection of invoice data for timely processing, auditing and action.

In one aspect a system is provided for automated adjustment of data collection intervals associated with regularly updated data. The system utilizes a computer with software executing thereon with the computer in communication with a data store computer over a network. The data store computer has access to data which is stored on the data store computer or on a storage accessible to the data store computer. The software has access to expected update timing data indicative of when a next expected update to data is expected to occur. The software queries the data store computer using a plurality of authentication keys. The software receives updated data from the data store computer and determines that updated data is not available for one or more of the plurality authentication keys. The software, based on the historical data and the expected update timing data, re-queries those of the plurality of data store computers whose update data was not available. The re-querying is done at a frequency based on a threshold not being exceeded and the threshold is adjusted based on at least a portion of the historical data associated with one or more attempts with one or more of the plurality of authentication keys to obtain updated data such that the frequency is determined based on a comparison of successful and unsuccessful attempts at obtaining updated data.

In certain aspects, the one or more attempts are associated with a security restriction on those one or more of the plurality of authentication keys associated with the one or more attempts. In other aspects, each authentication key is associated with a portion of the data stored on the data store computer which is different from portions of the data associated with others of the authentication keys. In further aspects the software has access to historical data indicative of when each data store computer was queried successfully to obtain updated data and the re-querying is done at a frequency based on the historical data. In other aspects the software detects a security restriction implemented by the data store computer and associated with at least one of the authentication keys based on the querying. The expected update timing data is updated based on the security restriction being implemented. In other aspects the update to the expected update timing data causes a next querying using the at least a first one of said plurality of authentication keys to be implemented later as compared to when said querying would have been implemented without the update to the expected update timing data. In other aspects the update to the expected update timing data adjusts the expected update timing data at least a second one of said plurality of authentication keys which is different than the at least a first one of said plurality of authentication keys. In certain aspects the second one of the plurality of authentication keys is associated with a query which successfully obtained update data without need of re-querying.

In further aspects a system for automated adjustment of data collection intervals associated with regularly updated data is provided. The system uses a computer with software executing thereon and the computer is in communication with a data store computer over a network. The data store computer has access to data which is stored on the data store computer or on a storage accessible to the data store computer. The software queries the data store computer using a plurality of authentication keys to obtain update data via the data store computer for those of the plurality of authentication keys associated with a prior query of the data store computer where update data was not available. The software query of the data store is a next attempt to obtain the update data which is run at a spacing since the prior query of the data store computer where update data was not available. The software detects one or more security restrictions by the data store computer associated with one or more of the authentication keys and adjusts timing for future queries of the data store for another of the plurality of authentication keys.

In certain aspects one or more of the prior queries are based on an expected update timing which is indicative of when the update data is expected to be available via the data store computer. In other aspects, said software adjusts timing for future queries and adjusts the spacing based on the one or more security restrictions. In certain aspects the software adjusts the expected update timing based on queries which result in at least one of the one or more security restrictions. In still other aspects, the software adjusting timing for future queries modifies the expected update timing for one or more of the plurality of authentication keys which are associated with a last successful attempt to obtain update data. In still other aspects, another of the plurality of authentication keys is associated with an expected update timing which is adjusted by adjusting the timing to be earlier than prior to adjustment. In yet other aspects, another of the plurality of authentication keys is associated with a first attempt to obtain update data which was successful during a last update data collection.

In other aspects a system for automated adjustment of data collection intervals associated with regularly updated data is provided. The system includes a computer with software executing thereon and the computer is in communication with a data store computer over a network. The data store computer has access to data which is stored on the data store computer or on a storage accessible to the data store computer. The software has access to expected update timing data indicative of when a next expected update to the data is expected to occur. The software queries the data store computer using a plurality of authentication keys based on the expected update timing data and said software receiving updated data associated with a first set of one or more of the plurality of authentication keys. The software also determines that updated data is not available for a second set of one or more of said plurality authentication keys. The software further re-queries the data store computer for the second set of the one or more of said plurality of authentication keys said software updating the expected update timing data based on when updated data becomes available as a result of the re-querying.

In certain aspects each authentication key is associated with expected update timing data such that at least two authentication keys of the plurality of authentication keys are associated with different expected update timing data. In further aspects the software detects one or more security restrictions associated with the re-querying and based on detection of the one or more security restrictions, the software adjusts timing of the re-querying to be spaced apart more than prior to adjustment. In other aspects the updated data is telecommunications and/or information technology (IT) invoice data. In other aspects a frequency of the re-querying is based on an amount of a prior invoice associated with the data for the second set of authentication keys. In further aspects said software detects one or more security restrictions associated with the querying and based on detection of the one or more security restrictions, software adjusts the expected update timing data.

In other aspects a system for automated adjustment of data collection intervals associated with regularly updated data is provided. The system uses a computer with software executing thereon and the computer is in communication with a data store computer over a network. The data store computer has access to data which is stored on the data store computer or on a storage accessible to the data store computer. The software queries the data store computer using a plurality of authentication keys with a request to obtain update data via the data store computer. The software detects one or more security restrictions by the data store computer associated with one or more of the authentication keys and adjusts timing for future queries of the data store for another of the plurality of authentication keys. The software queries the data store occurs at a time when updated data is not expected to be available based on expected update availability data accessible to the software. The software continues to query the data store computer until the security restriction is detected such that the adjusting timing for future queries results in the future queries being earlier than prior to the adjusting.

In other aspects the future queries are run at an interval such that the expected update timing data is indicative that each future query is likely to be successful. In other aspects, for the future queries which are not successful at obtaining update data, the system re-queries the data store computer to obtain the update data at a frequency which has been adjusted based on queries initiated when expected update data indicated updated data was not expected to be available. In other aspects the adjusting applies to one or more of the plurality of authentication keys which did not result in detection of the security restriction.

Other objects and the particular features and advantages thereof are shown and described in the following figures and description.

DETAILED DESCRIPTION OF THE INVENTION

Figure 1:
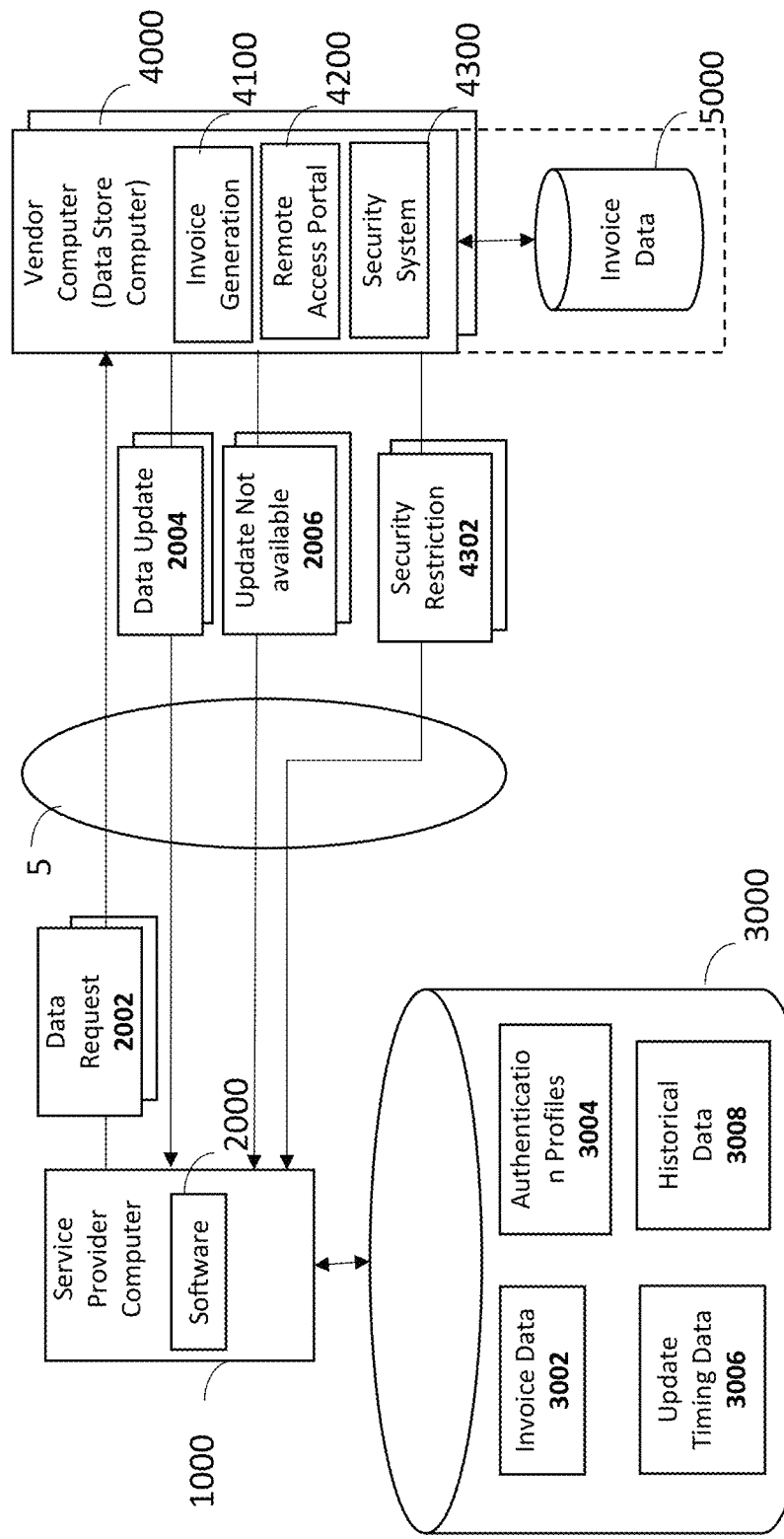
FIG. 1 a functional flow diagram according to the present invention.

A robotic software program runs autonomously and continuously in the background collecting invoice data as it is predicted to be available from a target set of sites. This software program has the necessary credentials to access the systems if they are password protected on behalf of the account holders. In the case of API access, the appropriate keys or authentication requirements are met to allow such access. This program can also be triggered and run manually.

Invoice data is captured and collected through various means including the interfacing with billing systems and web interfaces showing usage data for an account or other invoice management systems.

Availability of invoices is determined by a known schedule for a supplier. These intervals can be weekly, bi-weekly, monthly, first of the month, first Monday of the month, or any number of predictable intervals.

It is known and expected however that the interval will not be exact, and the system will attempt to retrieve the system at the predicted time and will retry until it has been able to receive the data.

Getting the invoice depends on the target system from which the data is obtained. In some cases, the system may allow querying through an API for the availability of the invoice for the period we are looking for. In other cases, a file may exist that can be downloaded.

In the case of screen scraping, one may need to look for the expected target date on the screen (example, June Invoice), or we may simply have to look for an invoice different from the one obtained last month (Example Invoice 008). Many such combinations may exist, and machine learning is used to determine how to approach each system learning from the historical successes and failures of attempts to access the data.

In order to prevent security concerns, various methods are employed to optimize the success rate of obtaining the necessary data while minimizing the risks of flagging security protocols.

a. A careful selection of when to initially attempt retrieval of the data is selected and made. This may coincide with the typical billing cycle such as a monthly invoice being available the $1^{st}$ of the month, or the first Monday of the month for example.
 b. A retry frequency count is set to determine how often to retry the system before manual intervention is required. This manual intervention may involve both verifying the access to the system or contacting the vendor if the invoice has not been made available at the expected time and location.
 c. A retry interval is set to select how often to query the system between retries so as not to trigger a lockout from the system or raise alarms such as DoS attack or other hacking attempts. It is also an undue burden on servers to access and retry or download and interact with such systems constantly. Of larger concern is overcoming any potential lockout scenarios which require manual intervention.
 d. Alternating access requests. In systems that limit access from a particular address or site, alternating sites can be used to increase the frequency of retries without flagging security protocols.

e. Careful recording of failure cause allows the system to distinguish between failure modes that are inherently transient and those that are unlikely to clear over time. The system recognizes transient failure modes and assigns an appropriate retry cadence. The system also adjusts and tunes itself based on the results obtained. For example, to determine the optimal time to get the initial invoice, it may move the retry a little earlier in the subsequent month, such as by one retry frequency interval to see if it can get the invoice earlier. If it is unable to do so, it will still allow for the system to get the invoice at the same time on the second retry.

How to automate and optimize the handling of any error conditions so as not to introduce additional delays is also required. For example, if there are authentication issues, these must be flagged and brought for manual intervention as soon as possible. A test access is performed prior to the expected availability of the invoice to test access to the system. For example, some systems require the periodic update and change of credentials on a regular schedule. This knowledge may be updated in the system or can be learned by the system to proactively request the changing of such credentials to avoid such manual intervention in future.

In the event that an invoice is not available after the retry threshold has been retried, manual interventions must also be triggered. In this case, it could be an issue on the retrieval system unrelated to credentials. This may include interfacing with the existing system, newly changed IT settings on the system preventing access, or any number of issues. The system can trace steps as to how far it went and what results it obtained to help diagnose any errors. The error could also be due to changes on the supplier side, or in some cases a simple delay in the availability of invoice data.

In the case of a lockout, an alarm is also raised triggering manual actions such as a person calling a support line to validate and unblock access to the system for future attempts. This event is fed back to the system so that the retry interval can be increased or retry count decreased to a new threshold that will no longer trigger the lockout.

Since the company running the invoice gathering system may have other customers with accounts accessing the same vendor system, these other accounts are also updated accordingly to avoid multiple lockouts.

Further, when invoices are available from a particular system, this information is also correlated with other requests for invoices for other customers from the same system thereby fast tracking getting the data.

Similarly, if a retry was made and the invoice was not available for a given customer, getting invoices for other customers in the same time period is also postponed. The system will also alternate retry attempts across multiple accounts, so that no individual customer gets locked out for multiple accesses. This may not work with systems that look at the originating IP address and still penalize or flag the system attempting to do so. In these cases, the company can use alternate IP addresses to access the system by running tasks across multiple locations or servers with differing public Ips.

A set of behavioral analytics is built up over time for vendor billing or invoice systems based on the experience of repeated access and characterization tests performed by the system. A company that obtains invoices for multiple customers is likely to have numerous accounts with the same vendors. Thus, access to the vendor system is made multiple times in a billing cycle as the individual customer accounts are each accessed. This allows for multiple access attempts to the same system to obtain knowledge about the system's behavior that can benefit all customers.

While the system is primarily interested in obtaining the invoice data as soon as it is available, the access attempts and the knowledge of how the vendor system interacts with these attempts is memorialized in a knowledge base of behavioral analytics which can be used for machine learning and continuous performance improvement.

In some cases, to build up this knowledge database, the system may attempt to access the vendor system even when invoice data is not expected to be available, simply to learn more about the system behavior.

One such example may be a system that periodically requires a change of password. Rather than run into an authentication failure when we expect the invoice to be available, we may attempt to access the system earlier just to validate that our credentials are still valid.

Another such example may simply be a new vendor system or a recent change to a known system which has modified the access strategy and expected behavior. In such cases, we may attempt to access the system simply to build up or update our knowledge base of how the system behaves.

Before accessing a particular vendor system on behalf of a customer, an access strategy is developed based on the known or expected behavior of the system. This strategy can include optimal timing, expected authentication challenges, and other expected behaviors or safeguards we expect the vendor system to put up which can help us avoid lockout scenarios.

In some cases, the systems expected behavior can be gleaned by simply recognizing the system or the software components used by the system such as the browser, the operating system, and the versions of software that interact with us.

In other cases, the system may be proprietary, and application specific safeguards and behavior may be implemented that must be learned.

In other cases, as a customer representative, data about the system behavior may simply be obtained by interacting with the vendor's IT department and manual programming of the optimal behavior into the system can be done so that the access strategy is acceptable to the vendor. This may be particularly true when changes or upgrades are going to take place. A notification from the Vendor can help prepare the system for the next communication attempt Accessing the system can divulge detailed information about the environment including underlying operating systems, browsers, and firewalls or switches used in this access. This information can sometimes be obtained simply by pinging or viewing data returned or can be gleaned from error messages or observed behavior. Once established, known behavior of the identified components and the versions of these can be used to build a more effective access strategy.

Data about the system behavior may be obtained from knowledge from publicly available system documents about the vendor or the components used in their system. Interaction with the suppliers of these components is another strategy to obtain information about expected behavior.

Systems are rarely static, and as vendor systems go through upgrades and updates, the behavior must also be tested and updated. In some cases, new security concerns also instigate safeguards that may be temporary or permanent in nature. For example, an ongoing DoS (Denial of Service) attack that is propagating on the web may cause IT departments to temporarily restrict or limit access. In other cases, a newly discovered vulnerability on components used in the vendors system may force the vendor to adopt more stringent safeguards to protect the system from hackers attempting to exploit these vulnerabilities.

Available public and private databases of known vulnerabilities and exploits are also available to IT departments and systems involved in establishing security. By recognizing current and possibly ongoing threats and the established norms or guidance on how to counter these the system behavior is modified to adapt. Vendors may employ enhanced security protocols which may include transient changes to access strategies. These enhanced security protocols may confuse our benign access attempts with ongoing threats attempting to leverage newly exposed vulnerabilities.

These changes and adaptations to protocols are rarely advertised, even to valid customers, due to the nature of security systems in general but also due to the immediacy of the actions that are required to protect these systems.

Due to the many variables and the quickly changing nature of these variables the system applies machine learning techniques to develop the behavioral analytics as well as the access strategy used on the attempts to retrieve invoices.

With the advantage of having many accounts with the same vendor, the system may have the luxury of repeated learning across accounts that a single account holder would not have. The knowledge obtained can be characterized and tied to the vendor in a way that all customers with that vendor will benefit. Further, should a security issue arise, the system can adjust access to the vendor system by other customers with that same vendor, thus not having the same security issues for all customers with a particular vendor.

While the system is intended to run automatically in the background and look for invoices automatically, it is also possible to access the system through a console and run the analysis manually. While in a typical automatic mode, the system will run on the expected invoice availability date.

A system consisting of a robotic software program running on one or more computers works autonomously and continuously in the background collecting invoice data from vendor invoice systems allowing for the payment of invoices on behalf of end customers using these services.

In one embodiment, the system accesses the companies account information through a software portal provided by the carrier or service provider that supplies invoice information as per the invoice cycle.

In another embodiment, the system can interact with a vendor billing system using available API (application Programming Interfaces) to obtain detailed billing data on behalf of customers using said services.

In yet another embodiment, the system accesses files from a vendor billing system obtaining these in an electronic format such as Electronic Data Exchange (EDI), Comma Separate Values (CSV), and extensible markup language (XML). In yet another embodiment the system performs screen scraping or other information gathering techniques to obtain the data from a website or portal supplied by the vendor.

In yet another embodiment, the system creates a set of behavioral analytics which can be used to build an access strategy to known vendor systems. This data set is built up from both known characteristics about the systems and their components as well as knowledge obtained over time through access attempts. This data set includes protocol level data in terms of timing, safeguards employed, and versions of software involved. The system uses sophisticated machine learning techniques to build and leverage this dataset when accessing vendor systems.

In one configuration a system and method of determining when to initially attempt retrieval of the data is selected and made that coincides with the billing cycle.

In another configuration a system and method of accessing and exploring how the vendor system interacts with access attempts is used to build up knowledge about vendor systems to optimize access attempts.

The method further comprises the development of an access strategy which includes a retry frequency count to determine how often to retry the system as well as a retry interval to select how often to query the system between retries as well as information about safeguards and timing used by the vendor system.

The method still further comprises the step of alternating access requests with systems that limit access from a particular address or site, alternating public addresses.

The method still further comprises the steps of handling exceptions such as failed authentication and errors in capturing the data that include triggering manual intervention where required.

Other aspects and features of the present invention will become apparent from consideration of the following description taken in conjunction with the accompanying drawings.

Referring now to the drawings, wherein like reference numerals designate corresponding structure throughout the views. The following examples are presented to further illustrate and explain the present invention and should not be taken as limiting in any regard.

FIG. 1 shows the service provider computer 1000 with software 2000 executing thereon. The computer/software has access to read/write to storage 3000 which contains a number of data records including invoice data 3002, authentication keys 3004, update timing data 3006 and historical data 3008. The invoice data 3002 will contain past invoices collected from the vendors. Typically these invoices will be associated with a specific customer of the service provider. This customer will have their associated authentication key 3004 which could be e.g. a user name and password or could be other types of authentication information needed in order to access the invoice data 5000 associated with the vendor computer 4000 (e.g. as part of the computer or on an external storage). The software 2000 will try to gather invoice data 5000 based on when an update is expected to occur, which would be indicated by the update timing data 3006. This update timing data may borrow from invoice data 3002 which may indicate that, for example, invoices are run on the 15$^{th}$ of every month. But the update timing data 3006 may go a step further and know specifically when invoices are usually available at the earliest. For example, if the invoice generation 4100 of the vendor results in invoices being available as invoice data 5000 typically at 1:00 AM on the 15$^{th}$, the software 2000 would use this more specific update timing data 3006 to issue a data request 2002 at, for example, 1:10 AM, thus gathering the invoice data 5000 reasonably close to the earliest possible time. However, the update timing data may also vary by authentication key 3004. The vendor computer 4000 and the invoice generation 4100 would often be expected to behave the same way across multiple different customers in that most authentication keys 3004 whose invoices are run on the 15$^{th}$ of a given month would be expected to have their updated data available at the same time.

However, as data requests 2002 are made to query the vendor computer 4000, the availability of a data update 2004 related to a particular request or the indication that an update is not available 2006 would be seen by the software 2000 and used to adjust the update timing data 3006. This indication of when requests were/were not successful can be stored as historical data 3008 so that the software 2000 can use this data in order to adjust when requests are generated in the future. Further, when requests are unsuccessful, a re-querying process would begin in which case the update timing data 3006 would be used to determine when to next query the vendor computer 4000. Thus, when the software 2000 determines when to make a data request 2002, expected update timing data is used and this expected update timing data can include, for example, invoice data 3002, update timing data 3006 and historical data 3008. The data request 2002 will typically include the appropriate authentication key 3004 based on the expected update timing data indicative on an update being available. The request uses the authentication key 3004 to access the remote access portal 4200 which may be a web portal, API, FTP or other way of gathering invoice data 5000.

In connection with the data request, if data is available, the data update 2004 will be sent to the service provider computer 1000 and that data will typically be stored as part of the invoice data 3002 for further processing and action. For certain ones of the requests, it is possible that an update may not be available 2006 and this would also be returned to the service provider computer for update to timing data 3006 and/or historical data 3008. The software 2000 would then re-query the vendor computer using another data request 2002 at a later time using a frequency or other type of timing or spacing as determined based on when an update is expected to occur and what types of security restrictions 4302 may exist. It is also understood that security restrictions 4302 may be detected as a result of a data update 2004 being made available, but that this would typically occur as part of the re-querying process as a result of a failed attempt to obtain update data.

The security restriction can be a number of different actions taken by the vendor computer security system 4300. These include a challenge question, captcha or even a lockout as some examples. In the challenge question/captcha example, these would be considered security restrictions if not normally used by the vendor computer security system 4300. This could be known based on historical data 3008 such that during prior runs of data requests, if the vendor computer did not utilize a challenge question but this time a challenge question was used, this could indicate that the security system 4300 has started to flag the querying as potentially illicit. Typically this would occur when prior data updates were received without need to re-query because of unavailable data. However, the occurrence of a security restriction could indicate that the re-query spacing/frequency/timing was too close together for the security system 4300. However, the security restriction may also be the result of an update to the vendor computer 4000 security system 4300 which simply requires that restriction each time, regardless of the timing or frequency of re-query. Over time as the system adjusts and responds to and tests security restrictions, it can be determined if the restriction is implemented as a result of the re-querying or if the restriction was simply implemented because that is how the security system 4300 has been updated.

Depending on how restrictive the security restriction is, the additional challenge question may or may not be deemed to require that the re-query frequency/timing/spacing is updated. Typically, the answers to challenge questions could be stored as part of the authentication keys 3004 and that the security restriction 4302 could trigger transmission of the challenge question answer as part of the data request 2002.

However, if instead of a challenge question, a captcha is provided, this may be deemed more restrictive because the computer will often not be able to get past the captcha without human intervention to respond to the captcha. In this case, the software 2000 would be programmed to try and avoid these more challenging security restrictions 4302 so that human intervention to answer the captcha challenge is not needed for a large number of the data requests 2002. Since the service provider will often have many customers, each data request 2002 will often be customer specific, usually at least in terms of the authentication key 3004 used. Thus, if all querying and re-querying results in a captcha that requires human intervention, the collection process will be slowed significantly. At the same time, there is a need to balance obtaining the update data as close as possible to first availability. In some cases, being early to request and requiring re-querying is useful for a few of the authentication keys 3004 because this information on the availability of data for one key can be relevant to other keys. For example, the update timing data 3006 and/or historical data 3008 can be used by the software to determine the expected update timing based on behavior of the vendor computer 4000 as a result of queries using different authentication keys 3004 (i.e. associated with different customers). As a result, the system can continually test and react to availability of data to try to minimize the amount of time the invoice data 5000 is available from the vendor computer 4000 but not actually stored as part of invoice data 3002 on the service provider system.

Thus, some of the data requests 2002 can actually be implemented early intentionally as a way to test the security system 4300 of the vendor computer and verify that the querying schedule is done as close as possible to the earliest reasonable time. If adjustments are needed as are result of this testing, the update timing data 3006 will now indicate this information which can be used by the software 2000 in order to adjust the query schedule. It is understood that the data 3000 may be related to specific vendor computers such that the schedule/timing of querying/re-querying is different for different ones of the vendor computers. Typically, the querying of the same vendor computer but with different authentication keys will be done using the same schedule logic, but adjusted for the dates the invoices are run in that the behavior of the system would be expected to be the same but that the availability of data would be typically predicated initially on when invoices are run in the first place. It is understood that different authentication keys used for the same vendor computer will normally be associated with different customers or accounts.

Figure 2:
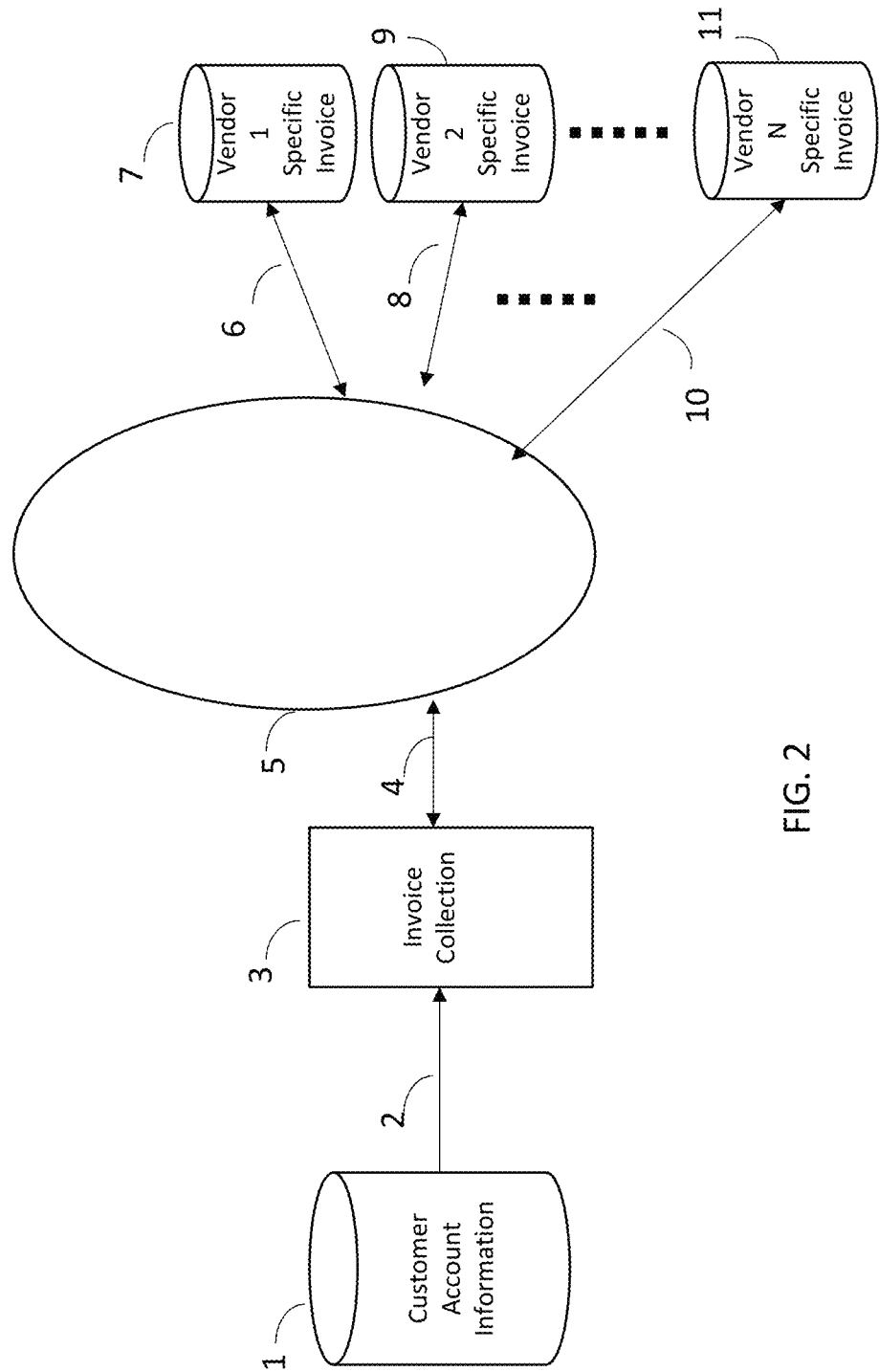
FIG. 2 is a functional flow diagram showing a high-level electronic invoicing collection process according to the system of FIG. 1.

Turning to the drawings, FIG. 2 shows a high-level invoice collection process. The system has access to customer account information 1 which may be an authentication key including login information and credentials for the customers being served. This invoice collection process 3 obtains data 4 via the network 5 from the many vendors that provide services to the customer.

A given vendor 7 has a specific invoice format which is returned 6 over the network 5 to 4 the invoice collection process 3. Similarly, another vendor 9 has another specific invoice format which is returned 8 over the network 5 to 4 the invoice collection process 3.

Finally, any number of different formats for different vendors may be obtained via this process, and yet another vendor 11 with a specific format sends 10 this invoice over the network 5 to 4 the invoice collection process 3 in the system.

Figure 3:
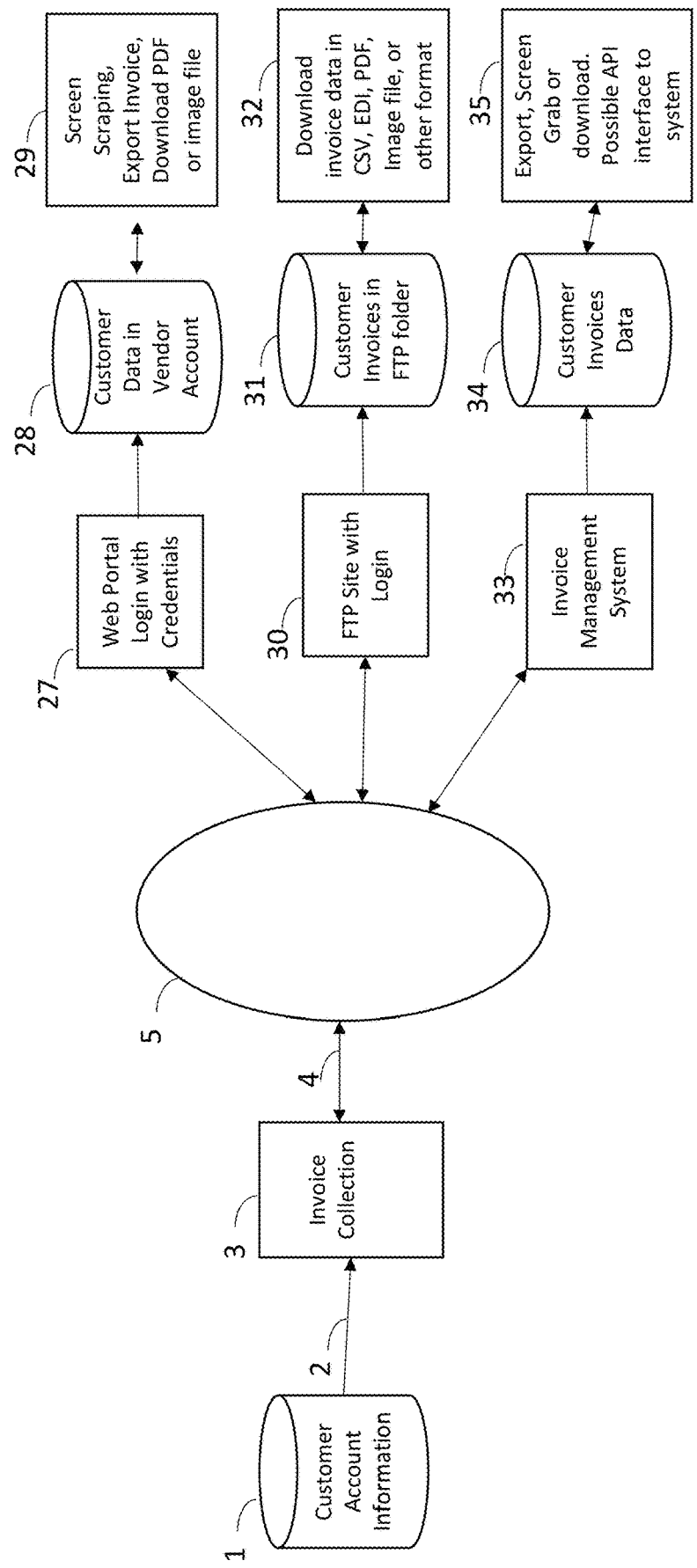
FIG. 3 is a functional flow diagram showing various invoice collection processes from vendors for according to the system of FIG. 1.

Turning now to FIG. 3 we see mode details about the various invoice collection processes from the vendors. Customer account information 1 is retrieved 2 by the invoice collection process 3. This customer account information 1 is required to access the customer data 5000 at the various storages 28,31,34 for the different vendors and likely includes destination addresses as well as login credentials. Once the invoice collection process has requested 2 the Customer account information 1, 3004, it requests 2002, 4 over the network/cloud 5 from the various vendors the data by various methods.

Customer Invoice Data 28 is obtained from one vendor through a web portal 27 where this data is obtained via screen scraping 29 or downloading via image or pdf format. Customer Invoice Data 31 is also obtained 36 from another vendor through an FTP site 30 where a vendor keeps invoices 31 in an FTP folder for collection. In this case the invoice collection process 3 can access this data through the ftp site 30 and access it in the FTP folder 31 where the data 32 may be downloaded in various formats which may be CSV, EDI, PDF or other formats as provided by the vendor.

Customer Invoice Data 34 is obtained from yet another vendor through an invoice management system 33. This data can be obtained by the invoice management system 3 via Exporting it into a file, doing a screen gram or possibly through application programming interface (API) commands 35. All of these various types/formats of invoice data once obtained are stored by the vendor computer, for example as part of the invoice data 3002. The data 28, 31, 34 may be considered portions of the invoice data 5000 described in FIG. 1.

Figure 4:
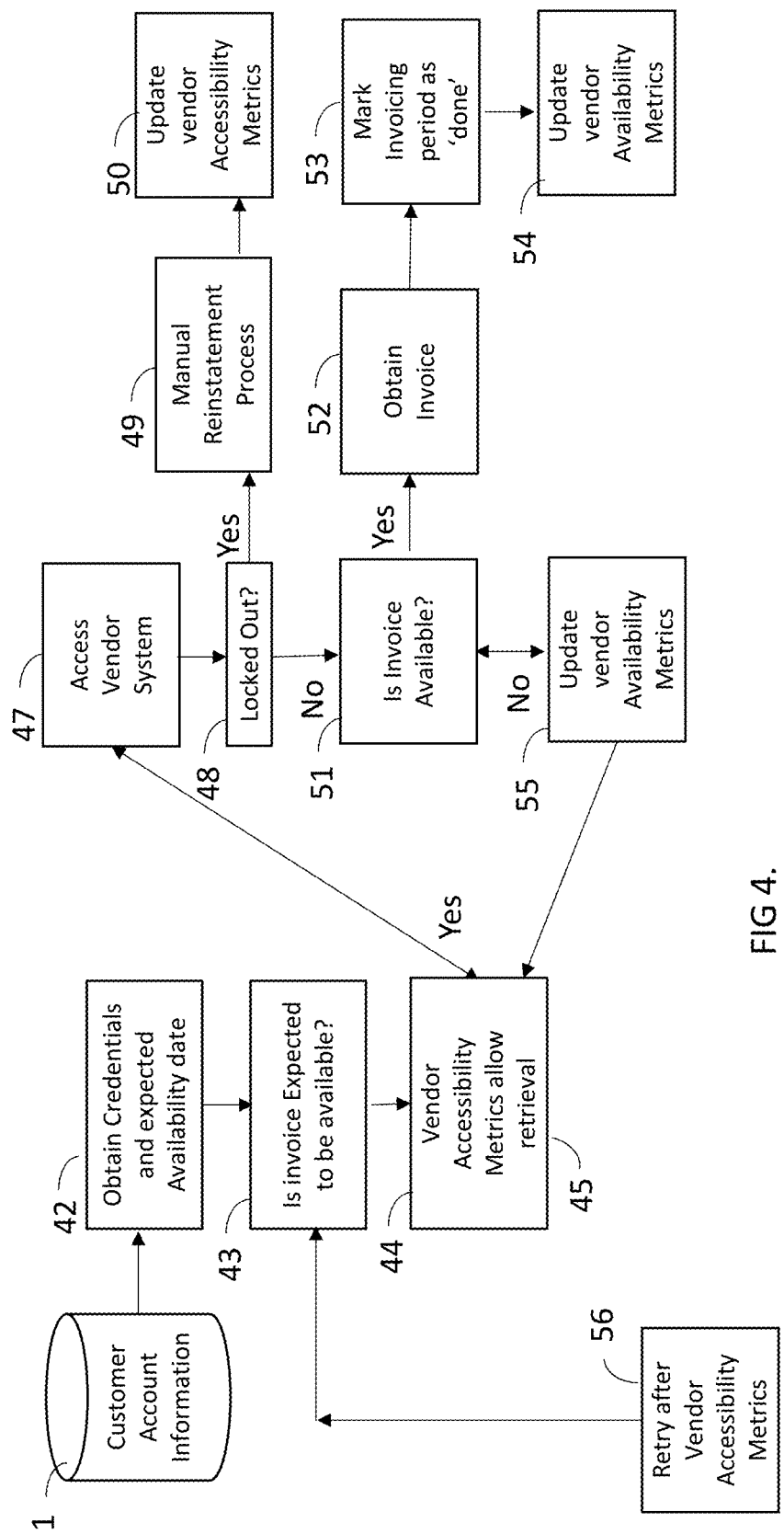
FIG. 4 is a functional flow diagram showing the processing flow within the invoice collection process for one customer for according to the system of FIG. 1.

Turning now to FIG. 4 we see various invoice collection processes from vendors and a single vendor is depicted as an example. Customer account information 1, 3004 is obtained 42 as well as an expected availability date. In the case of monthly billing, this date 42 may correspond to the day of the month that the invoice is expected to be available 43. As previously described this expected availability timing can be obtained through, for example, analysis of invoice data 3002, update timing data 3006 and/or historical data 3008. If the invoice is expected to be available 43 then additional Vendor accessibility metrics 44 are verified which include how often a system can be queried before it flags a security issue or other lockout mechanism. These metrics 44 may be stored as part of the historical data 3008 indicative of, e.g. when security restrictions 4302 have been imposed as a result of various querying/re-querying 2002.

If the vendor accessibility metrics 44 allow for the retrieval, the system will attempt to obtain 45 through the network 5 the invoice. First the vendor system is accessed 47 using the credentials or methods obtained from the customer account information 1 database.

If the system has locked out the process 48 then a manual reinstatement 49 may be needed. Such a lockout would then be compared to prior querying to obtain update data and the spacing/frequency/timing of querying/re-querying would be adjusted to avoid these lockouts requiring manual intervention. This manual intervention may involve calling the vendor to reenable the IP address or the account which is being used to capture the data. When resolved, vendor accessibility metrics 50 are updated at the service provider storage 3000. Additionally, if the lockout was due to frequent attempts, the vendor accessibility metrics are updated 50 to retry less often. If the system is not locked out 48 it will access the system and determine if the invoice is available 51. It is understood that the system will normally try to avoid these lockouts that require manual intervention, but that sometimes they are useful as testing markers for purposes of updating the data 3000 available to the software 2000.

If the invoice is available 51 then the invoice is obtained 52 and the current billing period invoice collection is marked as done 53 indicating that there is no longer a need to attempt to collect the invoice for the given billing period with the particular authentication key for which data collection was successful in that the data update has been obtained.

The vendor availability metrics are also updated to show this information and can be used by the system as intelligence for the collection of other invoices. In the case of errors with the invoice 52 or the inability to collect after retries, the invoice can be flagged for manual processing to retry collection, and this can be done by simply marking the current monthly collection period 53 as not done. In the case of the invoice not being available at the time of invoice collection, the vendor availability metrics 55 are also updated to reflect the non-availability. This information is used to train the system for subsequent billing periods as well as provide knowledge for other customer invoices which the system may attempt to retrieve 45,46,52 from the same vendor. The system will also then retry obtaining the invoice from the vendor after the vendor accessibility metrics 56 reflect that it is safe to retry again.

Figure 5:
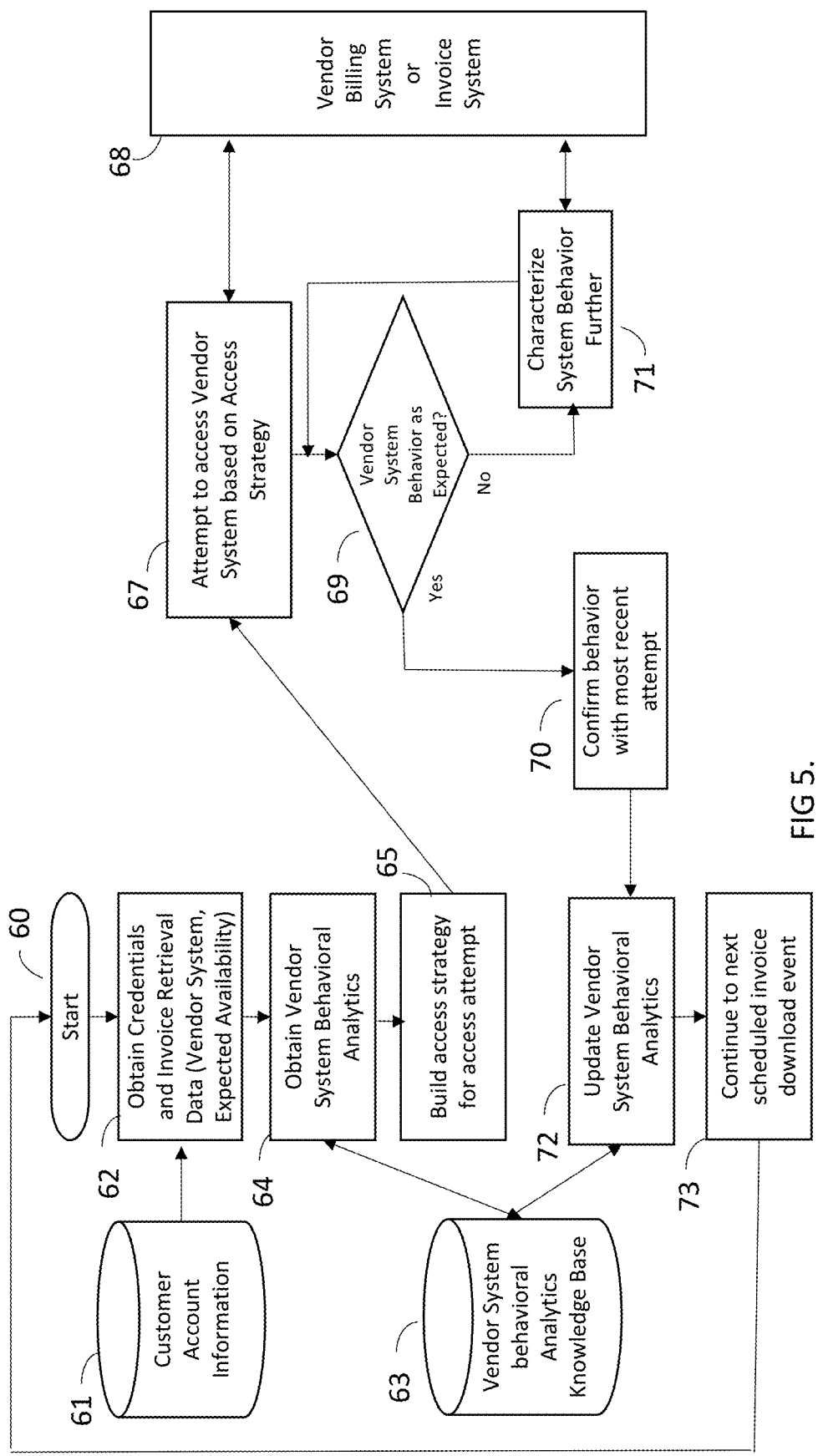
FIG. 5 is a functional flow diagram showing how the system develops behavioral analytics and access strategies to access vendor systems according to the system of FIG. 1.

Turning now to FIG. 5 we see how the system accumulates a rich set of behavioral analytics about vendor systems through knowledge built up through historical download activities. Once again, the system starts 60 by retrieving 62 customer account information or authentication keys which is required to access the vendor system 68/4000 applicable to the current customer. This data 1 includes credentials and authentication data required to access the system 68 as well as billing cycle data that includes the expected availability of invoices that may be obtained from the service provider storage 3000.

The system then retrieves 64 vendor behavioral analytics data 63 which has been accumulated through experience accessing the vendor system 68 for both the current customer as well as other customers on that system. This analytics data 63 may be encompassed by the invoice data 3002, update timing data 3006 and historical data 3008. Further, the vendor system 68 may have known safeguards that manifest expected behavior learned or known from other similar systems and can be thus characterized or confirmed 71. In a number of cases, the underlying customer may be new with authentication keys 3004 used for the first time by the service provider computer 1000, but analytics data 63 for the vendor 4000 may be applied to this new customer and possibly specific invoice data 3002 from a prior customer invoice that indicates the invoice run date. Thus, prior historical experience with a particular vendor 4000 can be useful for running data updates for new customers from a known vendor.

With this information 63 an access strategy 65 is built to attempt access to the vendor system. This strategy 65 may be as simple as telling the system not to access the system at this time if a lockout or other security restriction is expected. It may also be set to access the system 68 even if the invoice data is not expected to be available to obtain 71 valuable characterization data 63 about the system which is used to inform the access strategy 65 with a different authentication key but using the same vendor.

With the access strategy 65 defined, if such strategy includes an attempt to access, the system attempts to access 67 the vendor system 68 through the network 5. This access 67 will obtain information about the systems expected behavior. This may include timing data, response and challenge data, or other authentication or communications or protocol level insights.

If the vendor system's behavior matches the known behavior set-out in the access strategy 65 derived from the behavioral analytics 63, then we simply confirm 70 that the behavior is consistent with a time stamp and update 72 the behavioral analytics 63 to reflect the most recent access. If the vendor system behaves differently 69 the system/software may attempt to characterize the system further 71 through additional tests or accesses to obtain and update the characterization data. This may repeat 69/71 until the software develops a known behavior or knowledge that the queries may be introducing additional risk if additional characterization tests 71 are done. Typically, some of the more valuable information about the characterization tests 71 include detection of a lower level security restriction 4302, especially when it is known that there are higher level security restrictions 4302 that can be implemented. Knowledge of the timing and spacing of requests/queries and the various security restrictions implemented can inform the access strategy further in order to obtain updated data as fast as possible but without triggering onerous security restrictions.

The system then update 72 the vendor systems behavioral analytics 63 with any new information gleaned from the latest characterization tests and continue with the next scheduled invoice download event 73/60. This update is typically stored in the service provider storage 3000 as part of the various data categories described therein (or as part of additional data categories). It is understood that although FIG. 1 shows four different data categories that these categories can be part of a single database or separated into two or more databases. Through repeated accesses and continued characterization and learning the vendor behavioral analytics database grows a rich set of data that improves the systems behavior and odds of success at obtaining data updates and doing so as early as reasonably possible.

Figure 6:
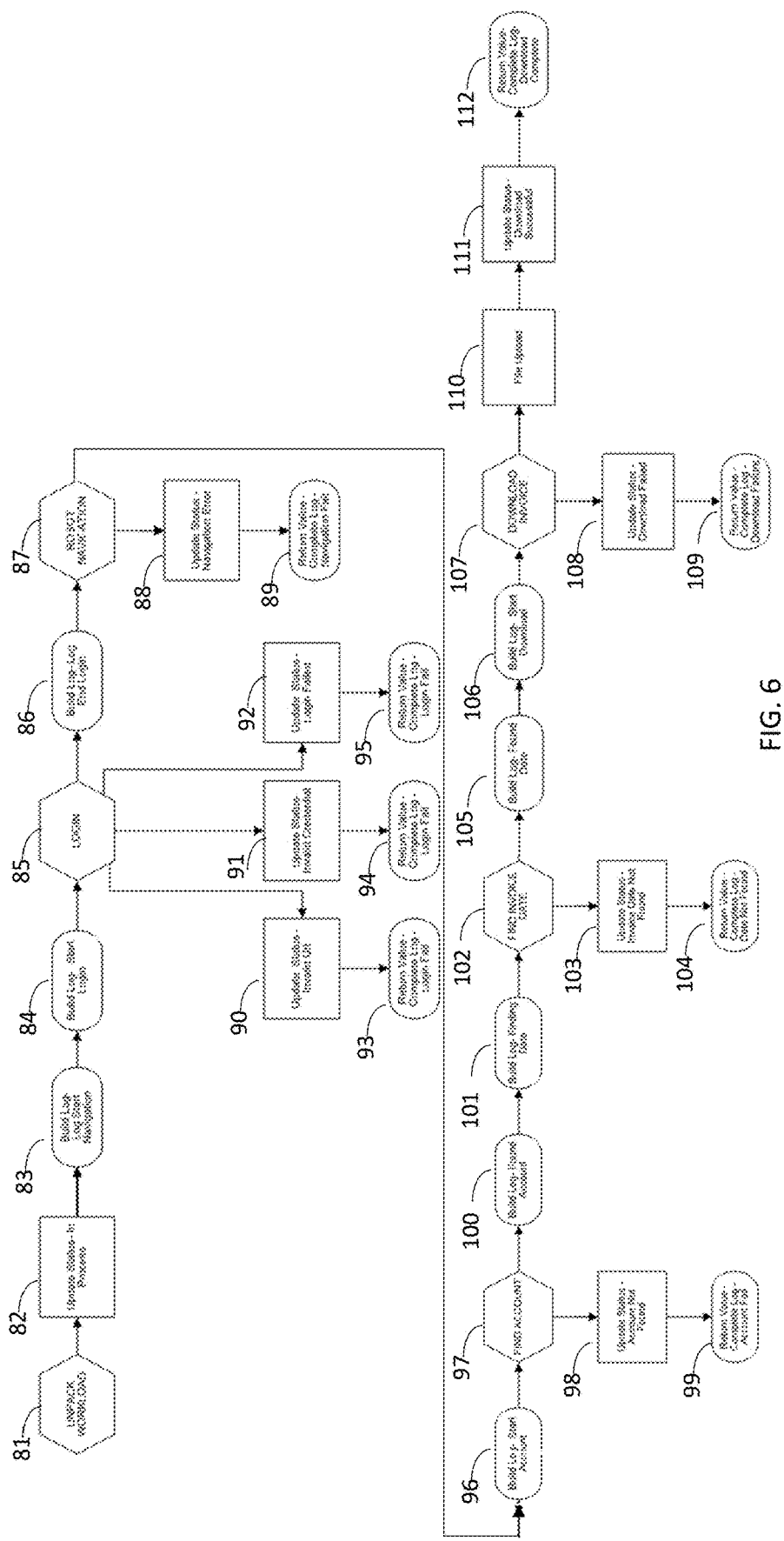
FIG. 6 is a functional flow diagram showing a typical robotic process automation flow for acquiring an invoice according to the system of FIG. 1.

Turning now to FIG. 6 we see an exemplary process automation flow for a robot tasked with retrieving invoices from a target system. The system unpacks the workload 81 which described the system information to access and details of the operation to be undertaken. The process is updated 82 to reflect that the given job is now in process, and 83 that the job has started navigation and 84 is attempting login.

When the login 85 is attempted, the results may result in showing an invalid URL 90 upon which the system returns a login failure 93. The system may also find that the credentials used were invalid 91 upon which it returns a login failure 94. Finally, other failures may occur, and a login failed 92 event will trigger the returning of values showing login fail 95.

If login 85 is successful, the system will log the end of login 86 event and then start the robot navigation 87 to obtain in invoice information. If Navigation errors occur 88, a navigation fail 89 message is returned. This may be triggered by unexpected screens, fields, or return values among other things.

If the navigation 87 proceeds as expected, the start account 96 event is logged and the system will attempt to find the account 97. If this account is not found 98 the status is updated accordingly and a return value of account failure 99 is returned. If finding the account 97 was successful, the account found 100 message is logged and the system also logs that it is now finding data 101.

The system now looks to find the expected invoice date 102. If the invoice is not yet available for this date or not found, an update with date not found 103 is logged and a status of date not found 104 is returned. If the system does find the invoice for the given date 102 then a log message for date found 105 is created and the system logs that it is now starting the download 106 process.

Should this download process 107 for the invoice fail 108 a Download failure 109 event is sent back. Otherwise the invoice file is uploaded 110 from the system and the status of download successful 111 is logged and the process is complete returning a value of download complete 112.

While the invention is susceptible to various modifications, and alternative forms, specific examples thereof have been shown in the drawings and are herein described in detail. Is should be understood however that the invention is not to be limited to the particular forms or methods disclosed but to the contrary, the invention is to cover all modifications, equivalents and alternatives falling within the scope of the disclosures and/or claims.

What is claimed is:

1. A system for automated adjustment of data collection intervals associated with regularly updated data comprising:
   a computer with software executing thereon, said computer in communication with a data store computer over a network, the data store computer having access to data which is stored on the data store computer or on a storage accessible to the data store computer;
   said software having access to expected update timing data indicative of when a next expected update to data is expected to occur;
   said software querying the data store computer and receiving at least some updated data from the data store computer and said software determining that at least some updated data is not available;
   said software, based on the expected update timing data, automatically re-querying the data store computer to retrieve the at least some updated data which was not available previously wherein the re-querying is done at a frequency based on a threshold not being exceeded and the threshold is adjusted based on at least one or more prior attempts to obtain updated data.

2. The system of claim 1 wherein the frequency of re-querying is based on the one or more attempts associated with a security restriction associated with the attempt which is unsuccessful.

3. The system of claim 1 wherein querying and re-querying is done with an authentication key associated with a portion of the data stored on the data store computer which is different from portions of the data associated with other authentication keys.

4. The system of claim 1 further comprising said software having access to historical data indicative of when each data store computer was queried successfully to obtain updated data and the re-querying is done at a frequency based on the historical data.

5. The system of claim 1 further comprising said software detecting a security restriction implemented by said data store computer and associated with an authentication key used for the querying and wherein the expected update timing data is updated based on said security restriction being implemented.

6. The system of claim 5 wherein the update to the expected update timing data causes a next querying using the authentication key to be implemented later as compared to when said querying would have been implemented without the update to the expected update timing data.

7. The system of claim 6 wherein the update to the expected update timing data adjusts the expected update timing data for at least a second authentication key which is different than the authentication key.

8. The system of claim 1 wherein the data store computer is a plurality of data store computers and the expected update timing data is different for each of said plurality of data store computers such that the query and re-query of different ones of the plurality of data store computers is implemented on different schedules.

9. A system for automated adjustment of data collection intervals associated with regularly updated data comprising:
- a computer with software executing thereon, said computer in communication with a data store computer over a network, the data store computer having access to data which is stored on the data store computer or on a storage accessible to the data store computer;
- said software querying the data store computer to obtain update data via the data store computer for which with a prior query of the data store computer, update data was not available and the software querying the data store is a next attempt to obtain the update data which is run at a spacing since the prior query of the data store computer where update data was not available;
- said software detecting one or more security restrictions by the data store computer associated with the authentication key and adjusting timing for future queries.

10. The system of claim 9 wherein one or more of the prior queries are based on an expected update timing which is indicative of when the update data is expected to be available via the data store computer.

11. The system of claim 10 wherein said software adjusts the expected update timing based on queries which result in at least one of the one or more security restrictions.

12. The system of claim 10 wherein an expected update timing is adjusted to be earlier.

13. The system of claim 9 wherein said software adjusting timing for future queries adjusts the spacing for query of the data store computer with a different authentication key.

14. The system of claim 9 wherein said software adjusting timing for future queries modifies the expected update timing based on a last successful attempt to obtain update data.

15. A system for automated adjustment of data collection intervals associated with regularly updated data comprising:
- a computer with software executing thereon, said computer in communication with a data store computer over a network, the data store computer having access to data which is stored on the data store computer or on a storage accessible to the data store computer;
- said software having access to expected update timing data indicative of when a next expected update to the data is expected to occur;
- said software querying the data store computer based on the expected update timing data and said software receiving updated data associated with a first data set and said software determining that updated data is not available for a second data set;
- said software, re-querying the data store computer for the second data set and said software updating the expected update timing data based on when updated data becomes available as a result of the re-querying.

16. The system of claim 15 wherein each data set is associated with expected update timing data.

17. The system of claim 15 further comprising said software detecting one or more security restrictions associated with the re-querying and based on detection of the one or more security restrictions, said software adjusting timing of the re-querying to reduce a chance of implementation of the one or more security restrictions.

18. The system of claim 15 wherein the updated data is telecommunications and/or information technology (IT) invoice data.

19. The system of claim 18 wherein a frequency of the re-querying is based on an amount of a prior invoice associated with the data for a second authentication key.

20. The system of claim 15 further comprising said software detecting one or more security restrictions associated with the querying and based on detection of the one or more security restrictions, said software adjusting the expected update timing data.

* * * * *